May 18, 1965 L. GRIMSHAW 3,183,823
GRILLS FOR COOKING FOOD
Filed July 1, 1963
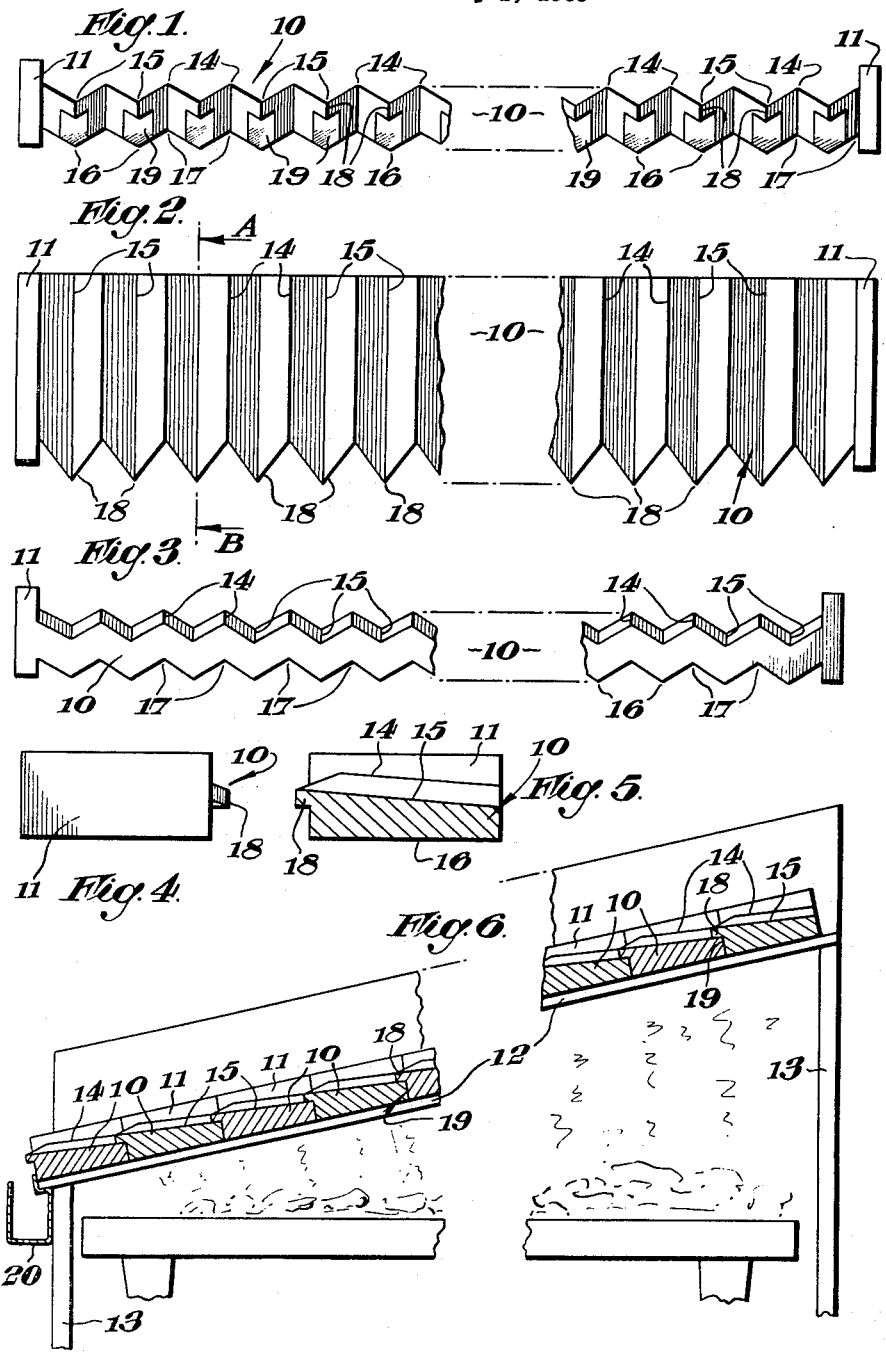
INVENTOR
LLOYD GRIMSHAW
By Emory L. Groff Jr Atty

United States Patent Office 3,183,823
Patented May 18, 1965

3,183,823
GRILLS FOR COOKING FOOD
Lloyd Grimshaw, 27 Amhurst Park, London, England
Filed July 1, 1963, Ser. No. 291,714
4 Claims. (Cl. 99—445)

This invention relates to cooking grills for food such as steaks, chops and the like. An object of the invention is to provide a grill which can be built up from bars, and which can be cleaned easily. Another object is to provide a grill for use over a fire, and on which the deposit of grease is kept to a low level, the cooking operation being speedy and effective.

According to this invention, there is provided an underfired cooking grill, comprising a plurality of transverse bars each having an upper surface corrugated or ridged from front to rear, and a plurality of spaced apart projections formed so that a bar can be supported by the projections on the rear of a bar in front, said projections being arranged so that a plurality of small apertures is provided through the built-up grill, means for the support of said grill above a firespace being provided so that the bars slope down from front to rear.

Conveniently the bars are supported at each end which ends are formed to co-operate with side supports, so that the grill slopes down from rear to front.

Preferably, the upper surface of each bar is ridged or channelled from front to rear. The ridges of bars align so that a plurality of drainage channels is provided as the top surface, and these can lead to a collecting channel at the front of the grill. The bars are interlocked as a rigid structure, and mutually contact to give good heat conduction.

The front of each bar can be serrated or toothed and is cut away from end to end beneath the serrations. This provides the projections to rest on a bar in front and also a surface (below the projections) on which the rear edge of said front bar can bear, thereby securing good heat conductivity.

As stated above, the bars are set up to form a grill which slopes down from rear to front, and each bar is preferably wedge shape, being thicker at the front than the rear, to permit a bar to sit on the rear of a bar in front, whilst providing an upper surface which is reasonably flat.

A preferred embodiment of bar, and a grill, will now be described with reference to the accompanying drawings, in which:

FIGURE 1 is a front view of a bar.
FIGURE 2, a plan view.
FIGURE 3, a rear view.
FIGURE 4, an end view.
FIGURE 5, a cross-sectional view on the line A–B FIGURE 2, and
FIGURE 6, a cross-sectional view of the same aspect as FIGURE 5 of a built-up grill.

As shown in the drawings, 10 is a bar made of cast iron of any suitable length. It has end lugs 11, 11, for bearing on suitable side supports (12, FIGURE 6) of a supporting frame structure (13, FIGURE 6).

The top is corrugated or ridged so that peaks 14 and corrugated or ridged valleys 15 of the bar are provided. The undersurface can be plane, but preferably is also serrated, toothed or of V-form providing peaks 16 and valleys 17. The front edge is formed with a cut-away or set-back part to leave a series of projections 18, each extending from a valley, and a series of bearing surfaces 19. The top surface of the bar slopes down from front to rear, as seen in FIGURE 5.

As will be seen from FIGURE 6, a grill is built up from bars which are laid on the support so that the projections 18 of a bar lie on the top surface of the rear of a bar in front. The rear edge of each bar can be plane so that the surfaces 19 bear thereon. It will be noted that the top surface of the built-up grid has corrugations from front to rear, these providing support for the meat to be grilled, and valleys for drainage. Further, the serrated front provides a series of small triangular holes through the grill, as the surfaces 19 are in front of the serration or tooth valleys. A collecting trough 20 is provided at the front of the grill.

The height of the rear of the grill can be made adjustable, and the space beneath the grill is the fire space.

The surfaces 19 can be co-planar, or each can be of a forwardly projecting flat V-shape. In all cases the shape of the rear of the bar is such to bear thereon, for example, can be straight as shown in FIGURE 2, or toothed as in FIGURE 3.

With the grill according to the invention, underfiring is possible without the depositing of excessive quantities of grease, which usually occurs with underfired grills. Further, the interlock arrangement results in speedy operating, and stoves heat effectively. The upper surface also acts as a "brander" of the cooking meat, resulting in quick working. The bars can be removed easily from the support structure for cleaning.

I claim:

1. An underfired cooking grill comprising a pair of spaced apart parallel side supports sloping downwardly from rear to front of said cooking grill, and a plurality of grill bars extending between said side supports and supported thereby, each said grill bar being ridged transversely of its length to provide alternate ridges and valleys, and being serrated along a front edge thereof to provide points in correspondence with said valleys and recesses in correspondence with said ridges said points being undercut to a predetermined depth and said grill bars being interlocked by the points of a first of said grill bars overlapping, to said predetermined depth, the valleys of a next forwardly arranged one of said grill bars, said ridges and valleys of said grill bars being aligned, and apertures being formed in said ridges at said recesses.

2. An underfired cooking grill according to claim 1 wherein each of said grill bars tapers in thickness from said front edge to a rear edge thereof.

3. An underfired cooking grill according to claim 2 wherein said valleys form drain channels from rear to front of said grill and a collecting trough is provided at said front of said grill.

4. An underfired grill according to claim 1 wherein an undersurface of each of said grill bars is ridged transversely of its length so as to provide alternate ridges and valleys.

References Cited by the Examiner
UNITED STATES PATENTS

| 3,973 | 5/45 | Hawkins | 99—445 |
| 347,822 | 8/86 | Newell | 99—445 |
| 1,510,547 | 10/24 | Ferrari | 99—445 |
| 2,374,749 | 5/45 | Howard | 99—444 X |
| 2,884,849 | 5/59 | Priem | 99—444 |

ROBERT E. PULFREY, *Primary Examiner.*
JEROME SCHNALL, *Examiner.*